United States Patent [19]
Harbe et al.

[11] 4,397,365
[45] Aug. 9, 1983

[54] BATTERY POWERED LOADING VEHICLE WITH BATTERY EXCHANGING DEVICE

[75] Inventors: Erik O. E. Harbe, Sköllersta; Kurt A. R. Sundberg, Örebro, both of Sweden

[73] Assignee: Atlas Copco Aktiebolag, Nacka, Sweden

[21] Appl. No.: 263,072

[22] Filed: May 12, 1981

[30] Foreign Application Priority Data

Jun. 2, 1980 [SE] Sweden ............................. 8004086

[51] Int. Cl.³ ............................................ B62D 25/00
[52] U.S. Cl. ................................. 180/68.5; 104/34; 105/51; 280/12 M; 414/349
[58] Field of Search ............ 104/34; 180/68.5, 65 R; 414/347, 349–350, 421, 534, 424, 619, 464–466, 546, 558, 607, 619, 719; 292/146; 105/50–51; 187/19 R; 280/12 R, 12 M, 759; 320/2, 7, 8, 15

[56] References Cited

U.S. PATENT DOCUMENTS

| | | | |
|---|---|---|---|
| 1,165,784 | 12/1915 | Klinglesmith | 180/68.5 |
| 2,003,394 | 6/1935 | Sells | 292/146 |
| 3,122,244 | 2/1964 | Corso | 414/462 |
| 3,327,875 | 6/1967 | Goodacre | 414/607 |
| 3,336,997 | 8/1967 | Yates et al. | 180/68.5 |
| 3,799,063 | 3/1974 | Reed | 104/34 |
| 3,814,272 | 6/1974 | Spratt | 414/629 |
| 3,834,563 | 9/1974 | Teti | 180/68.5 |
| 3,917,017 | 11/1975 | Deane | 320/8 |
| 3,998,342 | 12/1976 | Myers | 414/719 |

FOREIGN PATENT DOCUMENTS

| | | | |
|---|---|---|---|
| 965186 | 6/1957 | Fed. Rep. of Germany | 248/673 |
| 2436748 | 4/1980 | France | 414/719 |

Primary Examiner—David M. Mitchell
Assistant Examiner—Timothy Roesch
Attorney, Agent, or Firm—Frishauf, Holtz, Goodman & Woodward

[57] ABSTRACT

A loading vehicle operated by electric battery power includes a chassis, a loading bucket mounted at the front end of the chassis. The chassis also carries an electric traction motor, a battery box and a battery lifting device pivotally mounted to the rear of the chassis and movable relative to the chassis by power. The battery box is supported by the chasis and is removable therefrom by power actuation of the battery lifting device. The battery lifting device has a lifting frame forming a part thereof which projects rearwardly from the chassis so as to provide a seat for the battery box, the lifting frame being pivotally movable relative to the chassis by application of the power to lift the battery box relative to the chassis. The battery box is then placed on a pallet and a fresh battery box is arranged on the battery lifting device and moved in place on the chassis.

16 Claims, 10 Drawing Figures

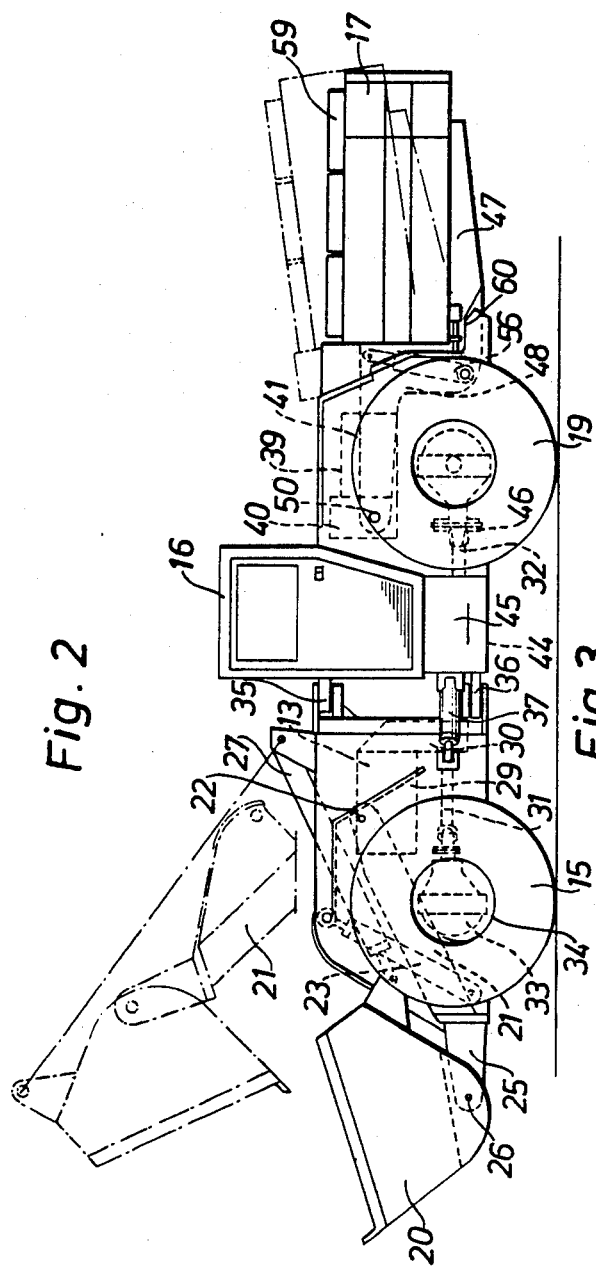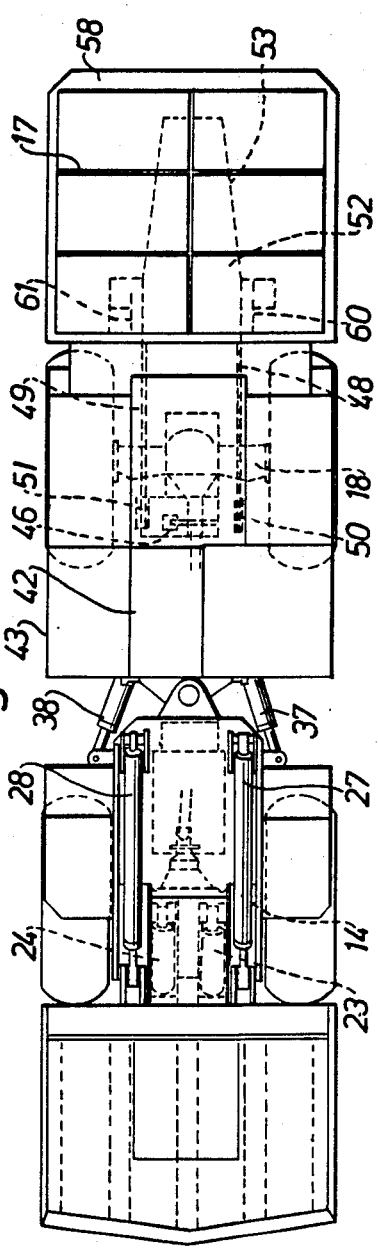

BATTERY POWERED LOADING VEHICLE WITH BATTERY EXCHANGING DEVICE

BACKGROUND OF THE INVENTION

This invention relates to a loading vehicle operated by electric battery power, wherein a chassis is associated with a loading means at the front end thereof, an electric traction motor, a battery box and a battery lifting device are carried on said chassis, and said battery box is supported by said chassis and removable therefrom by actuation of said lifting device. The invention also relates to a free standing supporting pallet arranged to be used in connection with such a vehicle.

Up to now, loading vehicles operated by electric battery power have been used in coal mines for relatively ligh work and, according to general belief, they have not been considered suitable for heavy duty applications, for example in metal mines.

It is an object of this invention to provide an electric battery driven loading vehicle which is not limited for use in coal mines but can be given a design and size so as to enable heavy duty applications for example in metal mines. Another object of the invention is to provide such a vehicle with improved means to facilitate the removal, carrying, and replacement of the battery.

BRIEF DESCRIPTION OF THE DRAWINGS

FIG. 2 is a side view of the vehicle where the battery box is shown in its normal position in full lines and in its elevated position in chain dotted lines. Correspondingly the bucket is shown in full lines when it is arranged for load hauling and in chain dotted lines when it is in the position for discharging its contents.

FIG. 3 is a plan view of the vehicle in the position according to the full lines in FIG. 2.

DETAILED DESCRIPTION

Figure 1:
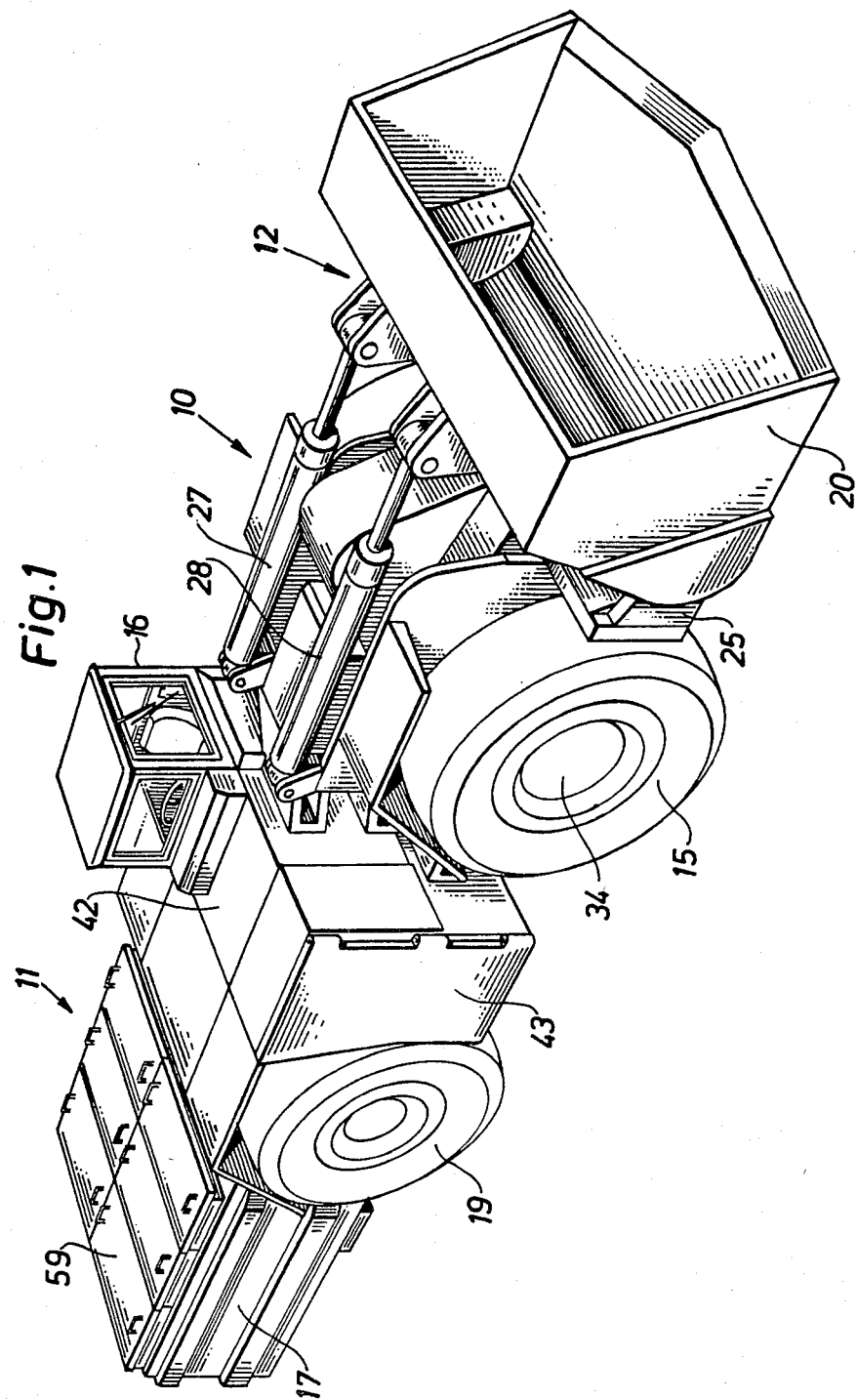
FIG. 1 is a perspective view of a loading vehicle according to the invention looking towards the front end of the vehicle.

The loading vehicle illustrated in FIGS. 1–3 comprises a front section 10 and a rear section 11 which are pivotally connected to each other. The front section 10 is provided with a chassis frame carrying a loading means 12 and a traction motor system 13 and is supported on a front wheel axle 14 with wheels 15, while the rear section is provided with a driver's compartment 16, a battery box 17 and a rear wheel axle 18 with wheels 19.

The loading means 12 comprises a bucket 20 which is connected to a boom 21. The boom 21 is verticaly swingable aout a swing-axis 22 by means of two hydraulic lifting cylinders 23 and 24. In the lowest position of the boom it rests on a not shown stop device in the chassis frame which device unloads the mountings 22 from the big loading pressure which appears during the scooping movement.

A fork means 25 is bolted to the front end of the boom 21 and the bucket is turnably journalled in bearings 26 in said fork means 25. The turning movement is actuated by two hydraulic cylinders 27 and 28 coupled between the bucket 20 and the chassis frame. The mutual positions of the bearing points for the bucket 20, the boom 21 and the hydraulic cylinders 27 and 28 are placed in such a way as to give the bucket 20 a parallel holding during the lifting movement; in other words, the angularity of the bucket in relation to the vehicle will remain constant during the lifting movement.

The traction motor system 13 comprises a series-wound direct current motor 29 which is connected to the front wheel axle 14 and to the rear wheel axle 18 by a reduction gear 30 and a front 31 and a rear 32 drive shaft. The front wheel axle 14 contains a differential gearing 33 including an automatic differential brake in order to have the maximum tractive force when the friction coefficient of the load is different for the two wheels 15. Planetary gearings are encased in the wheel centres 34.

The connection between the front 10 and the rear 11 section comprises an upper 35 and a lower 36 bearing which permit the sections 10 and 11 to be swingable in the horizontal plane. In order to reduce the bearing forces, the two bearings are arranged at a long distance from each other. The vehicle is steered by pivoting the sections 10 and 11 in relation to each other by means of two hydraulic cylinders 37 and 38.

The rear section 11 is also provided with a chassis frame in whose rear part a hydraulic pumping unit 39 is arranged which has two hydraulic pumps 40 and a driving motor 41 for the pumps 40. The motor 41 is a shunt-wound direct current motor. The pumps 40 supply the loading and the controlling systems of the vehicle with hydraulic oil. A hydraulic oil tank 42 is placed in the front part of the chassis frame and a control box 43 is attached to the front right side of the frame. The box contains the main part of the electrical equipment for controlling the traction motor 13 and the pump motor 41 and for charging a low voltage extra or auxiliary battery 44 placed in a box-like bracket 45 which is attached to the forward left side of the frame. The rear wheel axle 18 with the wheels 19 is swingably suspended under the rear part of the frame whereby the axle 18 can be swingable in order to simplify driving over rough ground. Besides the swingable mounting, the rear wheel axle 18 is of the same construction as the front wheel axle 14. A disc brake 46 is mounted on the rear drive shaft 32, which brake is intended to be a parking brake or an emergency brake. The normal travelling braking is obtained by switching the traction motor to be a generator, so-called regenerative braking, which also enables charging of the battery.

A lifting frame 47 is swingably connected to the chassis frame of the rear section 11 which frame 47 is provided for carrying the battery box 17. The frame 47 contains two bars 48 and 49 which, by means of two bearings 50 and 51, are mounted to the chassis. The bearings 50 and 51 are disposed in front of the rear wheel axis so that the bars 48 and 49 can be long enough for giving the battery box 17 a suitable pivoting movement. The bars are welded to a base plate 52 which forms a seat for said battery box 17. The rear part 53 of the plate is slightly wedge-shaped in order to be better guided into a correspondingly shaped part 54 in a battery pallet 55 (see FIG. 6) which shall be further described later on. The lifting frame 47 is pivotable by means of two hydraulic cylinders 56 coupled between each bar 48 and 49 and the frame. The battery box 17 comprises an outer case 58 which contains six batteries 59 connected in series, each having an electric voltage of 60 volts. The case 58 forms the outer limit of the vehicle which means that battery equipment of different types and sizes can be used without changing the other parts of the vehicle.

Figure 4:
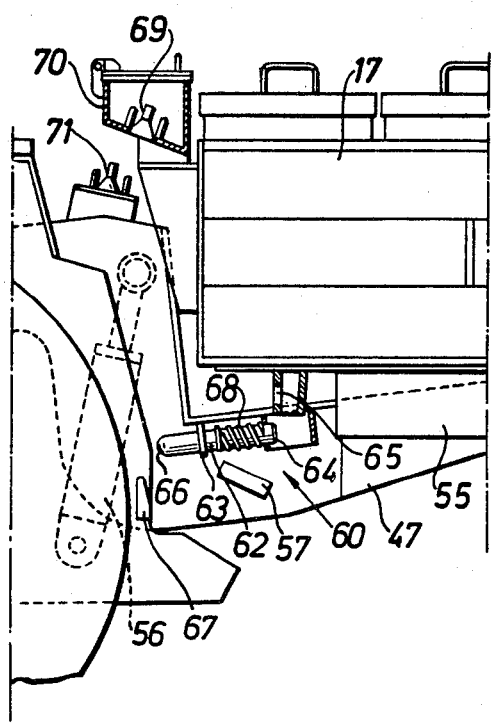
FIG. 4 is a side view of a part of the vehicle showing the mechanical and electrical connections between the vehicle and the battery box in a disconnected position.

Two latches 60 and 61 mounted on the lifting frame 47 lock the battery box 17 automatically to the lifting frame 47 when it is lowered to its normal position and unlock the battery box 17 when the frame 47 is lifted. As will be seen in FIGS. 4 and 5, each latch has a locking bar 62 guided in holes in two flanges 63 and 64 which are mounted on the lifting frame 47. When locking, the locking bar 62 is adapted to be inserted through a tie 65 mounted on the battery box 17. The locking motion is caused by the lifting frame which brings one end 66 of the locking bar 62 into contact with an actuating means 67 on the chassis frame, when the lifting frame 47 is lowered, and the unlocking motion is achieved by a return spring 68 arranged between the locking bar 62 and one of the flanges 64. A plug socket 69 is located in a contact box 70 mounted on the battery case 58 and a plug 71, shaped to fit in the socket 69, is arranged on the lifting frame 47. Said plug 71 and socket 69 connect automatically the battery box 17 to the electrical system of the vehicle when the box 17 is elevated from the pallet 55 and disconnect the battery box 17 when it is replaced on the pallet 55.

Figure 5:
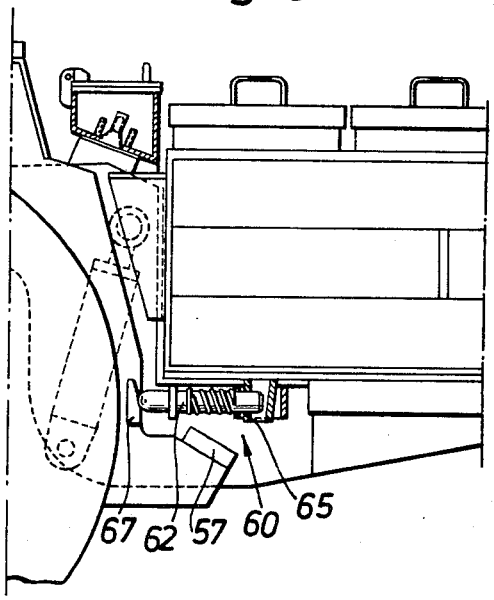
FIG. 5 shows the same vehicle part as FIG. 4 but with closed connections.

A projecting stop lug 57 is mounted on each side of the lifting frame 47, which lugs 57 are adapted to make the lifting frame 47 rest on the chassis frame when said lifting frame 47 is in its low position (FIG. 5).

Figure 10:
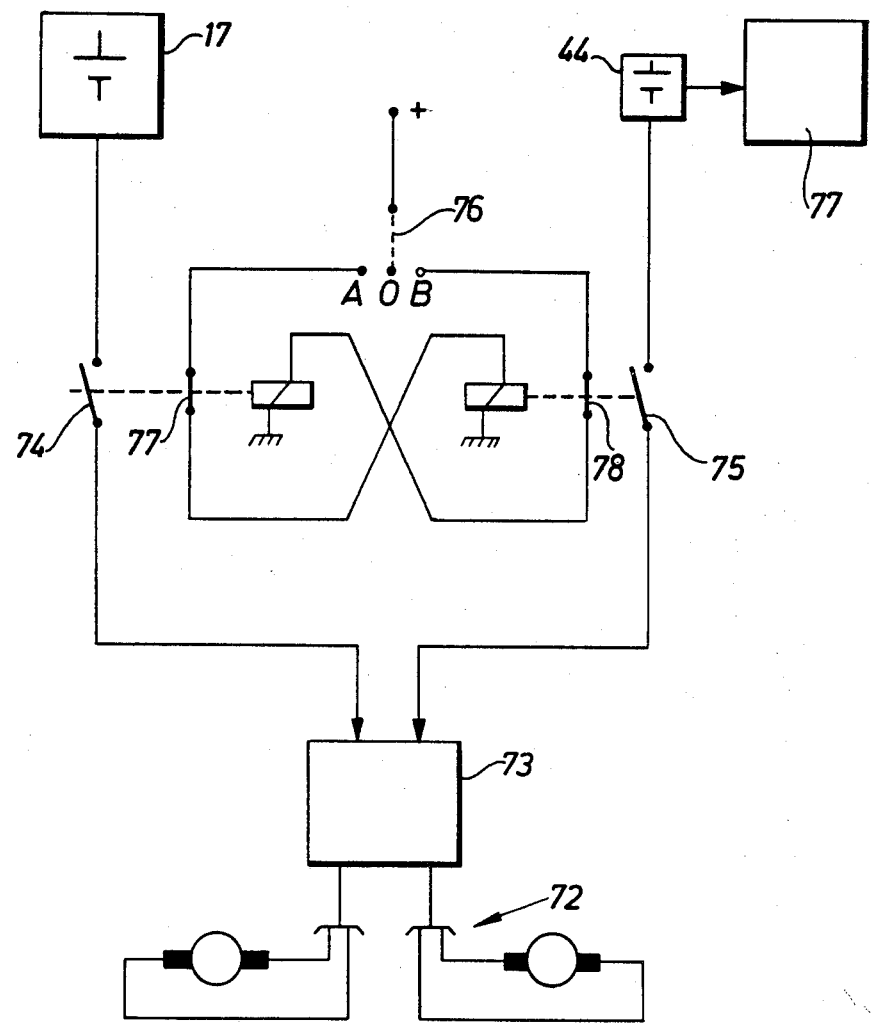
FIG. 10 is a schematic circuit diagram off the switching equipment for driving either with the main battery or with a smaller extra battery.

By available battery technique the accumulated battery charge will last for about four hours operation time. Then the battery must be exchanged by a charged battery. During the intervals of the changing procedure, when the battery box is disconnected, the extra auxiliary low tension voltage battery 44 is used to drive and operate the vehicle. The electrical between the two batteries is shown in FIG. 10. The high voltage battery in the battery box 17 is connectable to the driving and operating system 72 over a controller 73 by means of a contactor 74. In the same way the low tension voltage battery 44 is connectable to the driving and operating system 72 by another contactor 75. The switch-over is operated by a rotary switch 76 in the driver's compartment 16. In the position A of the switch 76 the contactor 75 will be closed and the low voltage battery 44 will be connected. In the position B the contactor 74 will be closed and instead the high voltage battery will be connected. The position O is a neutral position. The contactors 74 and 75 are equipped with cooperating contacts 77 and 78, respectively which will break the operating circuit for one contactor when the other one is closed. These switching means 74-78 prevent from connecting both batteries at the same time, even if one of the contactors should get stuck in a closed position. The normally required electrical equipment 79 of the vehicle, as for example the light, is always connected to the low voltage battery 44.

Figure 6:
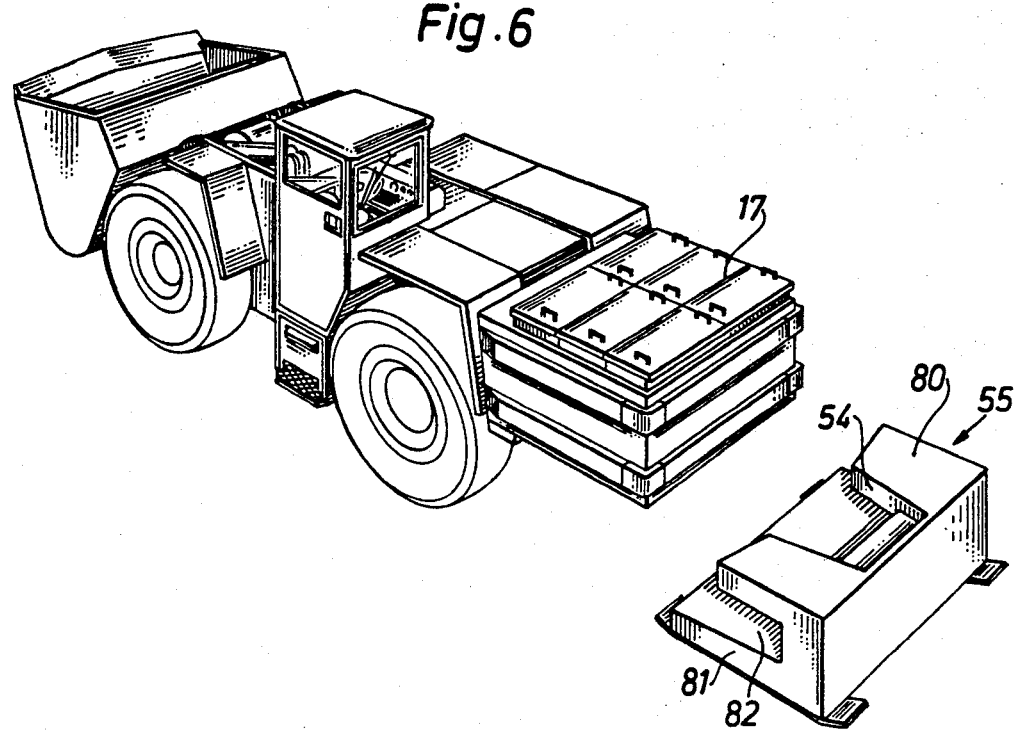
FIG. 6 shows in perspective view looking at the back of the vehicle how the vehicle showing is arranged when it is reversed to a battery pallet and FIGS. 7 and 8 show how the battery box is lowered to a position on the pallet.
Figure 9:
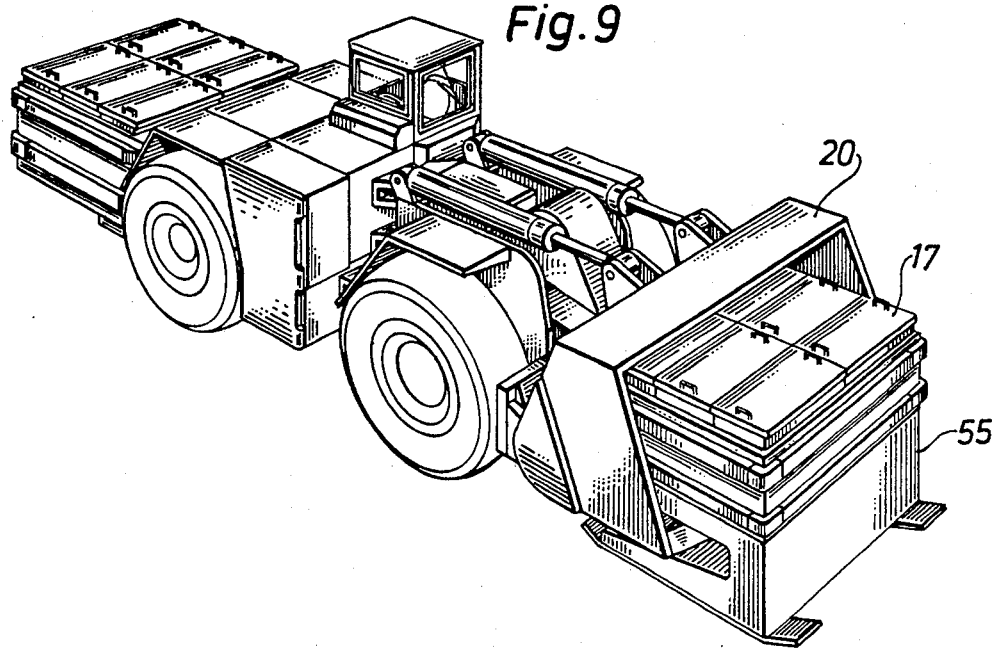
FIG. 9 is a perspective view of the vehicle during elevation of the battery pallet and the battery box in the bucket.

As will be seen from FIG. 6, a free standing battery pallet 55 is arranged to carry the unloaded battery box 17. The upper part 80 of the pallet 55 comprises an opening 54 through which the lifting frame 47 can be passed when the battery box is to be elevated from or lowered on to the pallet 55. The pallet has also a bottom plate 81 intended to be placed on the ground and an open space 82 between the upper part 80 and said bottom plate 81, in which space 82 the bucket 20 can be inserted to enable transport of the battery pallet 55 and of the battery box 17 as one unit, as shown in FIG. 9. The equipment for charging the batteries is associated with the pallet 55.

Figure 7:
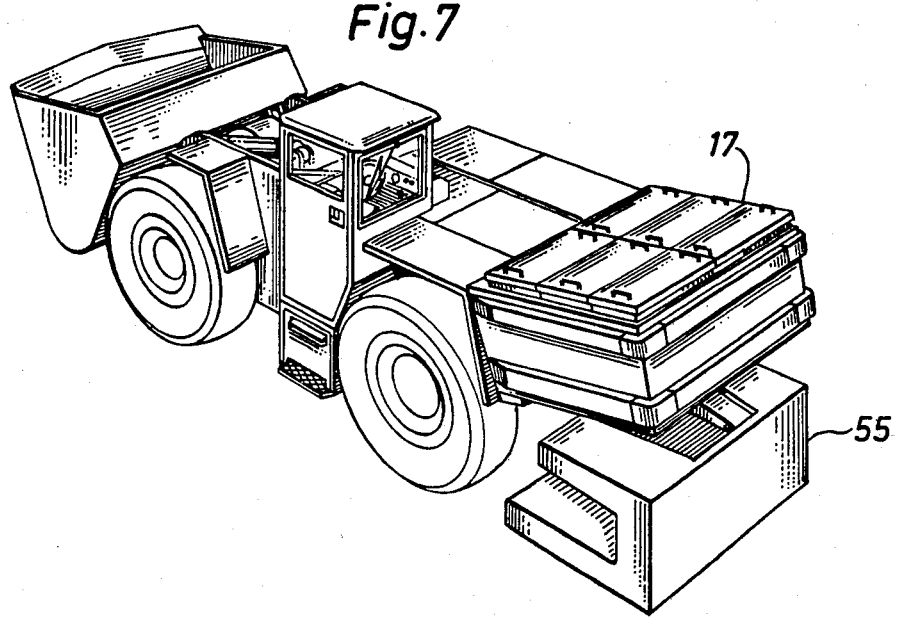
Figure 8:
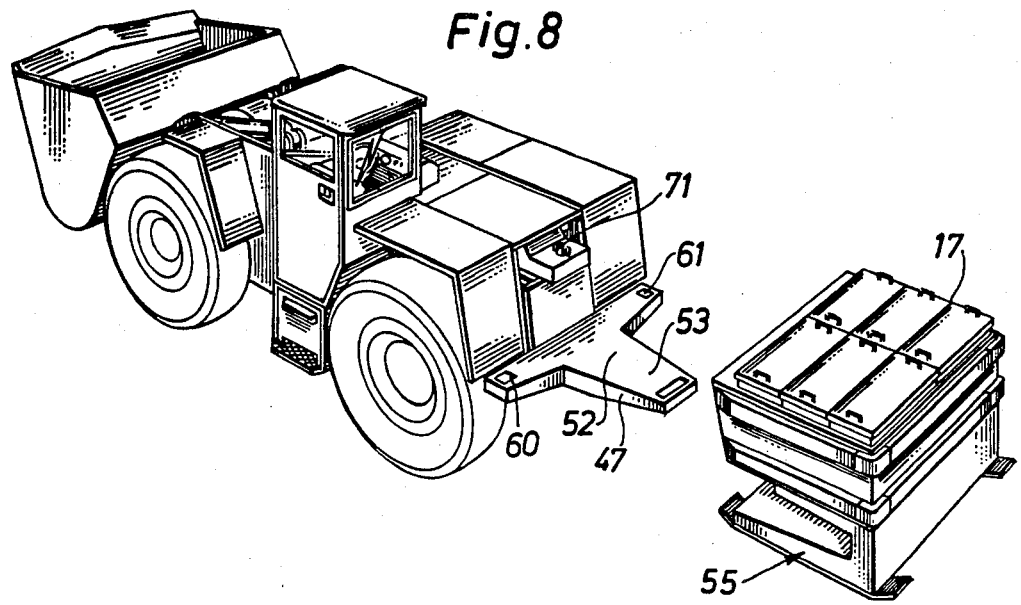

The battery changing is as follows, see FIGS. 6-8.

(a) The vehicle is moved backwards to a free battery pallet 55 and the battery box 17 is elevated with the lifting frame 47. During the lifting movement the latches 60 and 61 will be disconnected. The lifting frame 47 will then be guided into the opening 54 in the upper part 80 of the pallet 55 holding the battery box 17 somewhat above the pallet 55.

(b) The vehicle is arranged to be operated by the low voltage battery 44 and the battery box 17 is lowered on to the pallet 55 while the frame 47 passes through the opening 54. Thereby the plug 71 and the socket 69 will be automatically disconnected.

(c) The charging equipment is connected to the unloaded battery and is disconnected from another charged battery placed on a pallet at an adjoining location.

(d) The vehicle is driven by the low voltage battery 44 to the other battery pallet 55 with the charged battery and is moved backwards to the pallet.

(e) The battery is elevated by the lifting frame 47 whereby the plug 71 and the socket 69 will be connected automatically.

(f) The vehicle is arranged to be driven by the high voltage battery and is moved forwards while the frame 47 is lowered and the battery box 17 is locked up with the latches 60 and 61.

This completes the changing procedure and the vehicle is ready for continued operation. It is to be noted that the removal and the replacement of the battery is accomplished by the operation of the vehicle itself and that no extra person would be needed to help the operator.

Obviously various changes can be made in the details and arrangements of parts without diverging from the invention as defined by the following claims.

We claim:

1. A battery powered loading vehicle comprising:
a chassis having a loading means (12) at the front end thereof;
an electric traction motor (13) carried by said chassis;
a battery box (17) containing at least one battery;
a battery lifting device carried on said chassis;
said battery box (17) being supported relative to said chassis and being removable from said chassis by actuation of said battery lifting device;
an electrical system coupling said battery box to said traction motor;
horizontally disposed pivot means (50, 51) on said chassis for pivotally supporting said battery lifting device;
power means (56, 57) coupled between said chassis and said battery lifting device for pivoting said battery lifting device about said pivot means (50, 51); and said battery lifting device including a lifting frame (47) pivotally connected to and projecting rearwardly from said chassis so as to define a seat (52) for said battery box (17), said seat (52) being pivotable with said lifting frame by actuation of said power means;

said lifting frame (47) being pivotable between a high position and a low position and having means (60, 61) for locking said battery box (17) to said lifting frame (47) when said lifting frame is in its low position and for unlocking said battery box when said lifting frame is in its high position as a result of pivotal movement between said high and low positions.

2. The loading vehicle of claim 1, wherein said chassis is carried by a front and a rear pair of wheels (15, 19), said rear pair of wheels defining an axis (18) extending therebetween; said pivot means (50, 51) is located in front of said rear wheels (19); and said lifting frame (47) extends rearwardly from said pivot means (50, 51) traversing said axis (18) defined by said rear pair of wheels (19) in a direction substantially perpendicular to said axis (18).

3. The loading vehicle of claim 1, wherein said seat (52) comprises a wedge-shaped rear part (53) extending rearwardly of said chassis.

4. The loading vehicle of claim 1, wherein said electrical system includes circuit means coupling said battery box to said traction motor; and an electrical coupling device (71) integrated with said vehicle and coupled to said circuit means for automatically disconnecting said battery box (17) from said circuit means of said vehicle when said battery box (17) is removed from said vehicle.

5. The loading vehicle of claim 4, wherein said electrical system includes an auxiliary battery (44); and said circuit means includes switching means (74-78) for connecting the driving and operating system (72) of the vehicle to said auxiliary battery (44) for enabling the vehicle to be driven when said battery box (17) has been removed from the vehicle.

6. The loading vehicle of claim 5, wherein at least normal compulsory lighting electrical equipment (79) of the vehicle is always connected to said auxiliary battery (44).

7. The loading vehicle of claim 2, wherein said power means (56, 57) comprises at least one power jack disposed in front of said axis (18) defined by said rear pair of wheels (19).

8. A battery powered loading vehicle comprising:
a chassis having a loading means (12) at the front end thereof;
en electric traction motor (13) carried by said chassis;
a battery box (17) containing at least one battery;
a battery lifting device carried on said chassis, and including a generally horizontal battery lifting frame (47);
said battery box (17) being supported by said lifting frame and being removable from said chassis by actuation of said battery lifting device;
an electrical system coupling said battery box (17) to said traction motor (13);
horizontally disposed pivot means (50, 51) adjacent a rear end of said chassis for pivotally mounting said battery lifting frame to said chassis such that said battery lifting frame (47) projects rearwardly from said chassis;

power means (56, 57) coupled between said chassis and said battery lifting frame (47) for pivoting said battery lifting frame (47) about said pivot means (50, 51); and a seat (52) on the rear part of said battery lifting frame (47) underlying and carrying said battery box (17) thereon, said seat (52) being pivotable with said battery lifting frame (47) by actuation of said power means to selectively raise and lower said battery box (17) relative to said chassis.

9. The loading vehicle of claim 8, wherein said chassis is carried by a front and a rear pair of wheels (15, 19), said rear pair of wheels defining an axis (18) extending therebetween; said pivot means (50, 51) is located in front of said rear wheels (19); and said lifting frame (47) extends rearwardly from said pivot means (50, 51) traversing said axis (18) defined by said rear pair of wheels (19) in a direction substantially perpendicular to said axis (18).

10. The loading vehicle of claim 8, wherein said seat (52) comprises a wedge-shaped rear part (53) extending rearwardly of said chassis.

11. The loading vehicle of claim 8, wherein said electrical system includes circuit means coupling said battery box to said traction motor; and an electrical coupling device (71) integrated with said vehicle and coupled to said circuit means for automatically disconnecting said battery box (17) from said circuit means of said vehicle when said battery box (17) is removed from said vehicle.

12. The loading vehicle of claim 11, wherein said electrical system includes an auxiliary battery (44); and said circuit means includes switching means (74-78) for connecting the driving and operating system (72) of the vehicle to said auxiliary battery (44) for enabling the vehicle to be driven when said battery box (17) has been removed from the vehicle.

13. The loading vehicle of claim 12, wherein at least normal compulsory lighting electrical equipment (79) of the vehicle is always connected to said auxiliary battery (44).

14. The loading vehicle of claim 9, wherein said power means (56, 57) comprises at least one power jack disposed in front of said axis (18) defined by said rear pair of wheels (19).

15. In combination, a battery powered loading vehicle and freestanding supporting pallet adapted to support a battery box of the vehicle comprising:
a vehicle including:
a chassis having a loading means (12) at the front end thereof;
an electric traction motor (13) carried by said chassis;
a battery box (17) containing at least one battery;
a battery lifting device carried on said chassis, and including a battery lifting frame (47) of given size and shape;
said battery box (17) being supported by said lifting frame and being removable from said chassis by actuation of said battery lifting device;
an electrical system coupling said battery box (17) to said traction motor (13);
horizontally disposed pivot means (50, 51) on said chassis for pivotally mounting said battery lifting frame to said chassis such that said battery lifting frame (47) projects rearwardly from said chassis;

power means (56, 57) coupled between said chassis and said battery lifting frame (47) for pivoting said battery lifting frame (47) about said pivot means (50, 51); and a seat (52) on the rear part of said battery lifting frame (47) for carrying said battery box (17) thereon, said seat (52) being pivotable with said battery lifting frame (47) by actuation of said power means to selectively raise and lower said battery box (17) relative to said chassis; and a pallet (55) including:

a lower base part (81);

an upper part (80) connected to said lower part;

said upper part (80) of said pallet (55) having an opening (54) shaped and dimensioned such that said lifting frame (47) can be passed through said opening when the battery box (17) is to be lowered to or elevated from said pallet (55); and a further opening (82) in said pallet between said upper and lower parts (80, 81) thereof which is engageable by said loading means (12) of said vehicle being inserted therein so as to enable displacement of the pallet (55) with a battery box (17) thereon by movement of said vehicle.

16. The combination of claim 15, wherein said pallet (55) is generally U-shaped, said first-mentioned opening (54) being formed in a leg of the U-shaped pallet.

* * * * *

UNITED STATES PATENT AND TRADEMARK OFFICE
CERTIFICATE OF CORRECTION

PATENT NO. : 4,397,365
DATED : August 9, 1983
INVENTOR(S) : Erik O.E. HARBE, et al It is certified that error appears in the above-identified patent and that said Letters Patent is hereby corrected as shown below:

COLUMN 1, line 53, after "circuit diagram" change "off" to --of--;

COLUMN 3, line 48, after "auxiliary low" delete "tension";

COLUMN 3, line 49, after "The electrical" insert --switch-over--;

COLUMN 3, line 53, after "way the low" delete "tension".

Signed and Sealed this

Eighteenth Day of October 1983

[SEAL]

Attest:

GERALD J. MOSSINGHOFF

Attesting Officer

Commissioner of Patents and Trademarks